United States Patent
Li (10) Patent No.: US 10,613,369 B2
(45) Date of Patent: Apr. 7, 2020

(54) PRIVACY FILM, PRIVACY DISPLAY SYSTEM, DISPLAY SUBSTRATE AND DISPLAY DEVICE

(71) Applicant: BOE TECHNOLOGY GROUP CO., LTD., Beijing (CN)

(72) Inventor: Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 330 days.

(21) Appl. No.: 15/647,526

(22) Filed: Jul. 12, 2017

(65) Prior Publication Data
US 2018/0052357 A1    Feb. 22, 2018

(30) Foreign Application Priority Data
Aug. 19, 2016    (CN) .......................... 2016 1 0696831

(51) Int. Cl.
*G02F 1/1335* (2006.01)
*G02F 1/13* (2006.01)
(Continued)

(52) U.S. Cl.
CPC ........ *G02F 1/133509* (2013.01); *B32B 27/06* (2013.01); *G02F 1/1323* (2013.01);
(Continued)

(58) Field of Classification Search
CPC ............. G02F 1/133509; G02F 1/1323; G02F 1/1334; G02F 2001/133626;
(Continued)

(56) References Cited

U.S. PATENT DOCUMENTS

| 2016/0026061 A1* | 1/2016 | O'Keeffe | G02F 1/167 359/296 |
| 2018/0122292 A1* | 5/2018 | Ju | G02B 3/0031 |
| 2018/0129092 A1* | 5/2018 | Ikeda | G02F 1/134309 |

FOREIGN PATENT DOCUMENTS

| CN | 1651981 A | 8/2005 |
| CN | 104851394 A | 8/2015 |

OTHER PUBLICATIONS

First Office Action for Chinese Patent Application No. 201610696831.6 dated Feb. 2, 2019.

* cited by examiner

*Primary Examiner* — Collin X Beatty
*Assistant Examiner* — Grant A Gagnon
(74) *Attorney, Agent, or Firm* — Calfee, Halter & Griswold LLP (57) ABSTRACT

A privacy film, a privacy display system, a display substrate and a display device are provided. The privacy film includes a first electrode layer, a second electrode layer and an adjustment film layer between the first electrode layer and the second electrode layer. The adjustment film layer includes a plurality of first adjustment units and a plurality of second adjustment units alternately arranged along a first direction, the first adjustment unit has a width larger than that of the second adjustment unit in the first direction; and when the first electrode layer and the second electrode layer are powered on, the first adjustment unit has a light transmittance lower than a first threshold, and the second adjustment unit has a light transmittance higher than a second threshold, and the second threshold is larger or equal to the first threshold.

20 Claims, 3 Drawing Sheets

(51) Int. Cl.
  *G02F 1/1334* (2006.01)
  *B32B 27/06* (2006.01)
  *H04N 5/72* (2006.01)
  *G06F 1/16* (2006.01)
  *G06F 21/62* (2013.01)
  *G06F 21/84* (2013.01)
  *H04M 1/02* (2006.01)

(52) U.S. Cl.
  CPC .............. *G02F 1/1334* (2013.01); *G06F 1/16* (2013.01); *G06F 1/1637* (2013.01); *G06F 21/6245* (2013.01); *G06F 21/84* (2013.01); *H04M 1/02* (2013.01); *H04N 5/72* (2013.01); *G02F 2001/133626* (2013.01); *H04M 1/0266* (2013.01)

(58) Field of Classification Search
  CPC ......... G02F 1/134309; G02F 1/133528; G02F 1/133514; G02F 1/133512; G02F 1/13439; G02F 1/13; G02F 1/133504; G02F 1/13363; G02F 2201/121; G02F 2201/123; G02F 2201/44; G02F 2202/36; G02F 1/133345; G02F 1/133602; G02F 1/133603; G02F 1/133606; G02F 1/136286; G02F 1/137; G02F 1/167; G02F 2001/13712; G02F 1/133; G02F 1/133305; G02F 1/13342; G02F 1/133536; G02F 1/133553; G02F 1/133615; G02F 1/13362; G02F 1/1337; G02F 1/1339; G02F 1/292; G02F 2001/133541; G02F 2001/133638; G02F 2001/13706; G02F 2202/28; G02F 1/1303; G02F 1/13306; G02F 1/133308; G02F 1/133365; G02F 1/133371; G02F 1/13338; G02F 1/133382; G02F 1/1335; G02F 1/133524; G02F 1/133526; G02F 1/133621; G02F 1/133634; G02F 1/133707; G02F 1/133711; G02F 1/133753; G02F 1/133788; G02F 1/1343; G02F 1/134363; G02F 1/1347; G02F 1/13471; G02F 1/13475; G02F 1/136227; G02F 1/1368; G02F 1/13718; G02F 1/13781; G02F 1/15; G02F 2001/133342; G02F 2001/13345; G02F 2001/13347; G02F 2001/133531; G02F 2001/133543; G02F 2001/133548; G02F 2001/133562; G02F 2001/133567; G02F 2001/133614; G02F 2001/133633; G02F 2001/133635; G02F 2001/133715; G02F 2001/133761; G02F 2001/134345; G02F 2001/134381; G02F 2001/1351; G02F 2001/13756; G02F 2201/08; G02F 2201/307; G02F 2201/50; G02F 2202/16; G02F 2203/01; G02F 2203/02; G02F 2203/22; G02F 2203/30; G02F 2203/64; G02F 2203/66; G02F 2413/00; G02F 2413/10; G02B 5/00; H04N 5/72; B32B 27/06
  USPC ........................................................ 359/610
  See application file for complete search history.

PRIVACY FILM, PRIVACY DISPLAY SYSTEM, DISPLAY SUBSTRATE AND DISPLAY DEVICE

CROSS-REFERENCE TO RELATED APPLICATIONS

The present application claims priority to Chinese Patent Application No. 201610696831.6, filed on Aug. 19, 2016, and the entire contents thereof are incorporated herein by reference.

TECHNICAL FIELD

The present disclosure relates to the field of display technology, and more particularly to a privacy film, a privacy display system, a display substrate and a display device.

BACKGROUND

With the development of society and living condition, mobile phones, computers, televisions and other types of electronic devices have become indispensable in daily life. However, electronic devices may cause leakage of personal information while providing convenience. For instance, a display device in the related art generally has a relatively wide viewing angle, which is desirable for public display but undesirable for secrecy of personal information. In the existing privacy display technology, a shutter is provided outside a surface of a display screen as a privacy film to narrow the viewing angle and achieve the privacy effect. However, such privacy protection approach is inconvenient to be used since it requires mounting of a privacy film which has to be manually dismounted when it is not needed.

SUMMARY

The present disclosure provides a privacy film, a privacy display system, a display substrate and a display device.

In one aspect, the present disclosure provides a display device comprising a first electrode layer, a second electrode layer and an adjustment film layer interposed between the first electrode layer and the second electrode layer;

the adjustment film layer comprises a plurality of first adjustment units and a plurality of second adjustment units alternately arranged along a first direction, the first adjustment unit has a width larger than that of the second adjustment unit in the first direction; and when the first electrode layer and the second electrode layer are powered on, the first adjustment unit has a light transmittance lower than a first threshold, and the second adjustment unit has a light transmittance higher than a second threshold, and the second threshold is larger or equal to the first threshold.

In one embodiment, when the first electrode layer and the second electrode layer are powered off, the first adjustment unit has a light transmittance higher than the second threshold, and the second adjustment unit has a light transmittance lower than the first threshold.

In one embodiment, the first adjustment unit comprises a first liquid crystal cavity containing polymer dispersed liquid crystals therein, and the second adjustment unit comprises a second liquid crystal cavity containing organic electrolyte liquid crystals therein.

In one embodiment, when the first electrode layer and the second electrode layer are powered off, both of the first adjustment unit and the second adjustment unit have a light transmittance higher than the second threshold.

In one embodiment, the first adjustment unit comprises a first liquid crystal cavity containing polymer dispersed liquid crystals therein, and the second adjustment unit comprises a transparent thin film, the transparent thin film has a light transmittance higher than the second threshold regardless whether the first electrode layer and the second electrode layer are powered on or off.

In one embodiment, the outmost ends at both sides of the adjustment film layer are provided as the first adjustment units.

In one embodiment, the first adjustment units and the second adjustment units are disposed adjacent to each other.

In one embodiment, the first direction refers to a direction perpendicular to a line connecting the first electrode layer and the second electrode layer.

In one embodiment, the width of the first adjustment unit in the first direction is 2 to 6 times of the width of the second adjustment unit in the first direction.

In a second aspect, the present disclosure also provides a privacy display system comprising a receiving unit, a control unit and a privacy film described as above;

the control unit is coupled to the first electrode layer and the second electrode layer;

the receiving unit is configured to receive an instruction of initiating a privacy mode sent from the user, and send the instruction of initiating the privacy mode to the control unit; and the control unit is configured to control the first electrode layer and the second electrode layer to be powered on according to the instruction of initiating the privacy mode, such that the first adjustment unit has a light transmittance lower than the first threshold and the second adjustment unit has a light transmittance higher than the second threshold.

In one embodiment, the receiving unit is configured to receive an instruction of cancelling the privacy mode sent from the user, and send the instruction of initiating the privacy mode to the control unit; and the control unit is further configured to control the first electrode layer and the second electrode layer to be powered off according to the instruction of cancelling the privacy mode, such that the first adjustment unit has a light transmittance higher than the second threshold and the second adjustment unit has a light transmittance lower than the first threshold.

In one embodiment, the receiving unit is further configured to receive the instruction of cancelling the privacy mode sent from the user, and send the instruction of cancelling the privacy mode to the control unit; and the control unit is further configured to control the first electrode layer and the second electrode layer to be powered off according to the instruction of cancelling the privacy mode, such that the first adjustment unit has a light transmittance higher than the second threshold and the second adjustment unit has a light transmittance higher than the second threshold.

In a third aspect, the present disclosure further provides a display substrate comprising a back light source, a display panel and the privacy film as described above between the back light source and the display panel.

In one embodiment, the back light source is a back light source emitting a collimating light.

In a fourth aspect, the present disclosure also provides a display device comprising the display substrate described as above.

BRIEF DESCRIPTION OF THE DRAWINGS

In order to more clearly illustrate the technical solutions of the present embodiment or of the related art, the following drawings, which are to be used in the description of the embodiments or of the related art, will be briefly described. It should be apparent that the drawings in the following description illustrate some embodiments of the present disclosure, other drawings may be obtained by those skilled in the art from these drawings without creative effort.

DETAILED DESCRIPTION

In order to make the object, technical solution and advantages of the embodiments of the present disclosure more apparent, the technical solution of the embodiments of the present disclosure will be clearly and thoroughly described below with reference to the accompanying drawings of the embodiments of the present disclosure. Apparently, the embodiments described are a part of the embodiments of the present disclosure, rather than all of them. Based on the embodiments of the present disclosure, it will be understood by those skilled in the art that all other embodiments obtained without paying creative effort are within the scope of the present disclosure.

Figure 1:
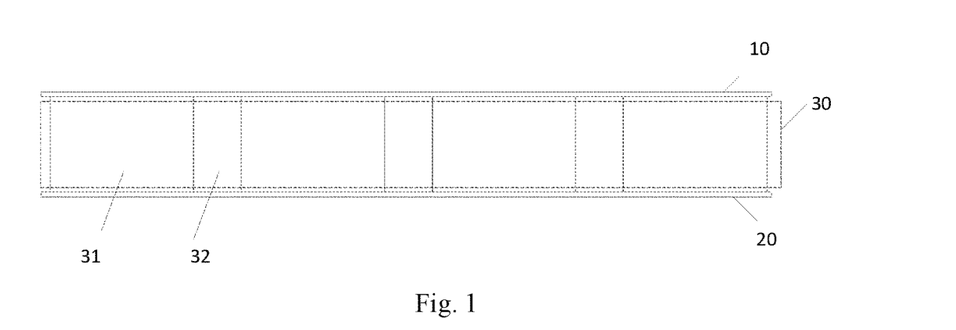
FIG. 1 is a schematic structural diagram of a privacy film according to an embodiment of the present disclosure.

FIG. 1 is a schematic structural diagram of a privacy film according to an embodiment of the present disclosure. Referring to FIG. 1, a privacy film according to the embodiment of the present disclosure includes a first electrode layer 10, a second electrode layer 20 and an adjustment film layer 30 interposed between the first electrode layer and the second electrode layer.

The adjustment film layer 30 includes: a plurality of first adjustment units 31 and a plurality of second adjustment units 32 alternately arranged along a first direction.

The first adjustment unit 31 has a width larger than that of the second adjustment unit 32 in the first direction. For example, the width of the first adjustment unit 31 in the first direction is 2 to 6 times of the width of the second adjustment unit 32 in the first direction.

When the first electrode layer 10 and the second electrode layer 20 are powered on, the first adjustment unit 31 has a light transmittance lower than a first threshold, and the second adjustment unit 32 has a light transmittance higher than a second threshold. In this embodiment, the second threshold is larger or equal to the first threshold. For example, the first threshold may be 25%, and the second threshold may be 60%.

In an embodiment of the present disclosure, in order to achieve the privacy effect, when being powered on, the first adjustment unit may have a light transmittance lower than the first threshold and the second adjustment unit may have a light transmittance higher than the second threshold. Since the width of the first adjustment unit is larger than that of the second adjustment unit, the resulted viewing angle becomes smaller, achieving privacy effect. Here, the first adjustment unit is provided wider and the first adjustment unit has a light transmittance lower than the first threshold for the privacy purpose, while the second adjustment unit has a light transmittance higher than the second threshold is to ensure that the legal user may clearly see the screen.

Figure 2:
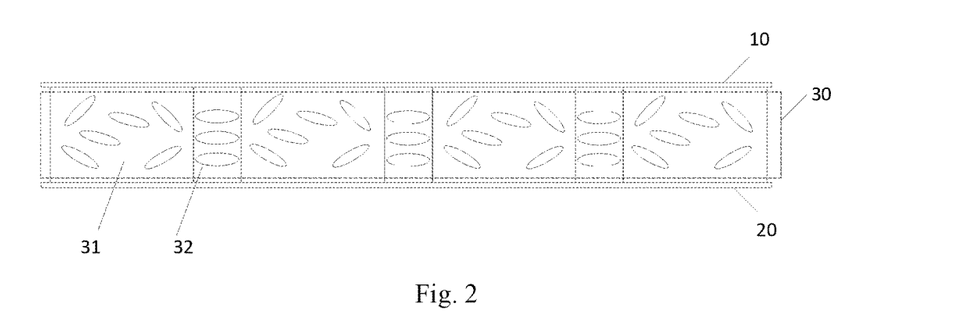
FIG. 2 is a schematic structural diagram of a privacy film according to another embodiment of the present disclosure.

In an implementation of the present disclosure, referring to FIG. 2, for example, the first adjustment unit 31 may contain polymer dispersed liquid crystals therein, and the second adjustment unit 32 may contain organic electrolyte liquid crystals therein. Thus, when the first electrode layer 10 and the second electrode layer 20 are powered on, part of light from a backlight assembly directly transmits through the first adjustment unit 31 containing polymer dispersed liquid crystals, and part of the light is scattered through the second adjustment unit 32 containing organic electrolyte liquid crystals. Since the first adjustment unit 31 has a width larger than that of the second adjustment unit 32, the viewing angle is relatively small.

Figure 3:
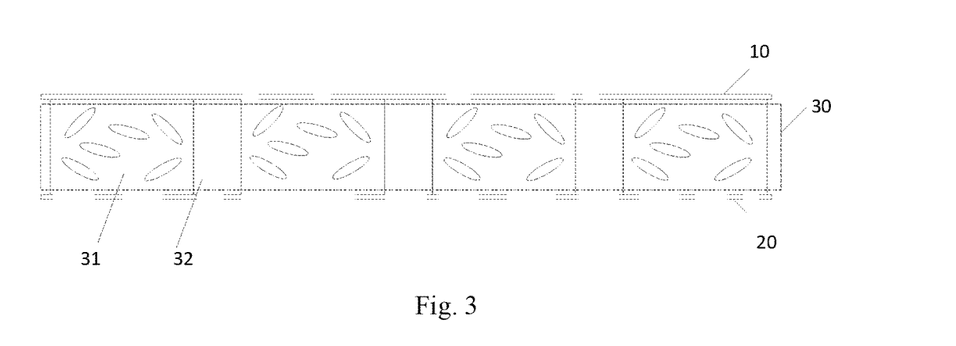
FIG. 3 is a schematic structural diagram of a privacy film according to yet another embodiment of the present disclosure.

In another implementation of the present disclosure, referring to FIG. 3, for example, the first adjustment unit 31 may contain polymer dispersed liquid crystals therein, and the second adjustment unit 32 may be provided with a transparent thin film therein. In this implementation, the light transmittance of the transparent thin film is higher than the second threshold, regardless whether the first electrode layer 10 and the second electrode layer 20 are powered on or off. Thus, when the first electrode layer 10 and the second electrode layer 20 are powered on, part of the light transmits directly through the first adjustment unit 31 containing polymer dispersed liquid crystals, such that the light transmittance of the first adjustment unit 31 is lower than the first threshold and the light transmittance of second adjustment unit 32 is higher than the second threshold. Moreover, since the first adjustment unit 31 has a width larger than that of the second adjustment unit 32, the viewing angle is relatively small.

The specific embodiment of the first adjustment unit 31 and the second adjustment unit 32 are not limited to the above two forms, as long as the first adjustment unit 31 has a light transmittance lower than the first threshold and the second adjustment unit 32 has a light transmittance higher than the second threshold when being powered on. The present disclosure is not limited thereto. For example, the first adjustment unit 31 may be implemented as a first type of electronically controlled optical film, and the second adjustment unit 32 may be implemented as a second type of electronically controlled optical film. When being powered on, the first type of electronically controlled optical film has a light transmittance lower than the first threshold, and when being powered on, the second type of electronically controlled optical film has a light transmittance higher than the second threshold.

Here, the first electrode layer 10 and the second electrode layer 20 may be an indium tin oxide or indium zinc oxide electrode layer.

It can be seen from the above description that, the privacy film according to the embodiment of the present disclosure may adjust the size of the viewing angle through electronic control, so as to achieve a privacy protection function. There is no need to frequently install and remove the privacy film according to an embodiment of the present disclosure, which may achieve a privacy protection function merely by electronically controlled adjustment, and thus is easy to be used.

In the above description, the operation of the privacy film in a privacy protection mode has been discussed. Further, when the first electrode layer 10 and the second electrode layer 20 are powered off, the privacy film may be switched to a public mode instead the privacy protection mode. In this case, there are two situations.

1. When the first electrode layer 10 and the second electrode layer 20 are powered off, the first adjustment unit 31 has a light transmittance higher than the second threshold, and the second adjustment unit 32 has a light transmittance lower than the first threshold.

In this situation, since the first adjustment unit 31 has a width larger than that of the second adjustment unit 32, and the first adjustment unit 31 has a light transmittance higher than the second threshold, therefore, the viewing angle is relatively large. Accordingly, by switching power on and off, it is possible to achieve switch between a narrow viewing angle and a wide viewing angle.

2. When the first electrode layer 10 and the second electrode layer 20 are powered off, both of the first adjustment unit 31 and the second adjustment unit 32 have light transmittance higher than the second threshold, to achieve a larger viewing angle and a better viewing effect.

For the above first situation, the first adjustment unit 31 may include a first liquid crystal cavity containing polymer dispersed liquid crystals therein, and the second adjustment unit 32 may include a second liquid crystal cavity containing organic electrolyte liquid crystals therein. Thus, when the first electrode layer 10 and the second electrode layer 20 are powered off, part of the light is scattered through the first liquid crystal cavity containing polymer dispersed liquid crystals, and part of the light directly transmits through the second liquid crystal cavity containing organic electrolyte liquid crystals. Since the first liquid crystal cavity has a width larger than that of the second liquid crystal cavity, the viewing angle is relatively large. Therefore, by switching the power on and off, it is possible to achieve switch between a narrow viewing angle and a wide viewing angle.

For the above second situation, the first adjustment unit 31 may include a first liquid crystal cavity containing polymer dispersed liquid crystals therein, and the second adjustment unit 32 may a transparent thin film. The light transmittance of the transparent thin film is higher than the second threshold, regardless whether the first electrode layer 10 and the second electrode layer 20 are powered on or off. Thus, when the first electrode layer 10 and the second electrode layer 20 are powered off, part of the back light is scattered through the first liquid crystal cavity. Since the first adjustment unit 31 has a high light transmittance, and the transparent film of the second adjustment unit 32 has a high light transmittance regardless whether the power is on or off, when being powered off, it is possible to achieve a relatively large viewing angle. Accordingly, by switching the power on and off, it is possible to achieve switch between a narrow viewing angle and a wide viewing angle.

Hereinafter, the operating principle of the first liquid crystal cell containing polymer dispersed liquid crystals when being powered on and off will be described with reference to FIGS. 4 and 5.

Figure 4:
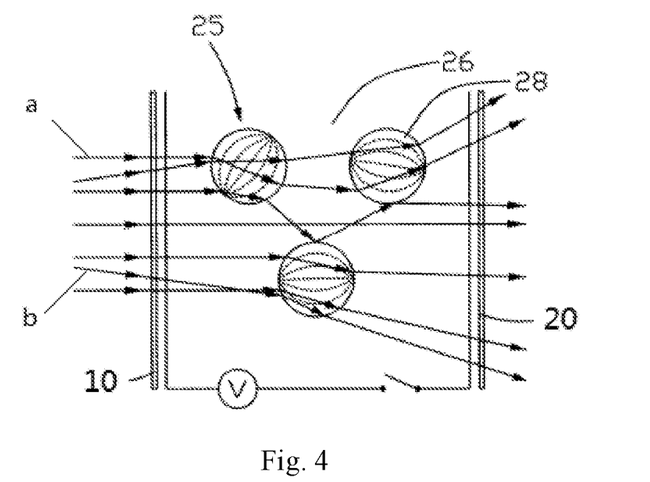
FIGS. 4 and 5 are schematic diagrams of operating principle of a first liquid crystal cell containing polymer dispersed liquid crystals when being powered on and off respectively.

Referring to FIG. 4, FIG. 4 is a schematic diagram illustrating optical principle of the first liquid crystal cell containing polymer dispersed liquid crystals when not being applied with a voltage. In beams emitted from a backlight module, a beam perpendicular to the first liquid crystal cavity is referred to as a beam a, and a beam not perpendicular to the first liquid crystal cavity containing polymer dispersed liquid crystals is referred to as a beam b.

When the first electrode layer 10 and the second electrode layer 20 are not applied with a voltage, liquid crystal molecules 28 in liquid crystal drops 25 in the first liquid crystal cavity are in bipolar arrangement and have axial anisotropy. A liquid crystal drop 25 has refractions in various directions that are different from the normal refractions of the liquid crystal molecules 28, while the refractions of the polymer 26 are substantially the same as the normal refractions of the liquid crystal molecules 28. Therefore, the liquid crystal drop 25 has refractions in various directions that are different from refractions of the polymer 26 in various directions. Thus, the incoming beams a and b are scattered at the interface between the liquid crystal drop 25 and the polymer 26, such that the first liquid crystal cavity containing polymer dispersed liquid crystals emits scattered beams.

Figure 5:
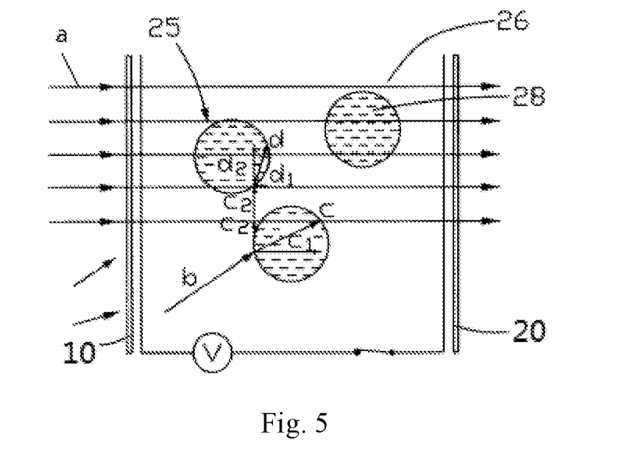

Referring to FIG. 5, FIG. 5 is a schematic diagram illustrating optical principle of the first liquid crystal cell containing polymer dispersed liquid crystals when being applied with a voltage. When the first electrode layer 10 and the second electrode layer 20 are applied with a voltage, an electrical field perpendicular to the first electrode layer 10 and the second electrode layer 20 is generated, such that the liquid crystal molecules 28 in the liquid crystal drops 25 have their major axes arranged in parallel along the direction of the electrical field. In the incoming direction of the beams a, the liquid crystal drop 25 has a refraction the same as the normal refraction of the liquid crystal molecules 28, and in that direction, the polymer 26 has a refraction substantially the same as the refraction of the liquid crystal drop 25. Therefore, the incoming beams a are not scattered at the interface of the liquid crystal drops 25, and directly transmit the liquid crystal drops 25.

In the incoming direction of a beam b, a liquid crystal drop 25 has a refraction that is different from the normal refraction of a liquid crystal molecule 28. Therefore, in that direction, the polymer 26 has a refraction different from the refraction of the liquid crystal drop 25. Thus, the incoming beam b is scattered at the interface of the liquid crystal drops 25. The beam b becomes a beam c after a first refraction. The beam c has a vertical component $c_1$ and a horizontal component $c_2$. The vertical component $c_1$ directly transmits through the film of polymer dispersed liquid crystals, just like the beam a. The horizontal component $c_2$ is refracted again at the interface of the liquid crystal drop 25, to form a beam referred to as a beam d. The beam d has a vertical component $d_1$ and a horizontal component $d_2$. The vertical component $d_1$ directly passes through the first liquid crystal cavity containing polymer dispersed liquid crystals. The horizontal component $d_2$ refracted again at a next liquid crystal drop 25 in a manner similar to that of the horizontal component $c_2$. After multiple refractions, the oblique incoming beam b has small amount of oblique outgoing light, and the beams emitted from the first liquid crystal cavity containing polymer dispersed liquid crystals are substantially perpendicular to a display panel. Since there is small amount of oblique outgoing light, the brightness in an oblique direction is not enough to be viewed.

In addition, since the organic electrolyte liquid crystals has an opposite property to that of the polymer dispersed liquid crystals, description of the specific operating principle will not be repeated.

Further, for the above first situation, the following implementation is also possible. For example, the first adjustment unit 31 may also be implemented as a first type of electrically controlled optical film, and the second adjustment unit 32 may also be implemented as a second type of electrically controlled optical film. In this implementation, the first type of electrically controlled optical film, when being powered on, has a light transmittance lower than the first threshold, and the second type of electrically controlled optical film, when being powered on, has a light transmittance higher than the second threshold. The first type of electrically controlled optical film, when being powered off, has a light transmittance higher than the second threshold, and the second type of electrically controlled optical film, when being powered off, has a light transmittance lower than the first threshold.

Further, for the above second situation, the following implementation is also possible. For example, the first adjustment unit 31 may also be implemented as a first type of electrically controlled optical film, and the second adjustment unit 32 may also be implemented as a third type of electrically controlled optical film. In this implementation, the first type of electrically controlled optical film, when being powered on, has a light transmittance lower than the first threshold, and when being powered off, has a light transmittance higher than the second threshold. The third type of electrically controlled optical film, when being powered on and off, always has a light transmittance higher than the second threshold.

In addition, in order to achieve a better privacy protection effect, preferably, the outermost ends at both sides of the adjustment film layer 30 are provided as the first adjustment units 31. Thus, since the outermost ends at both sides of the adjustment film layer 30 are provided as the first adjustment units 31, when the privacy mode or the privacy protection mode is turned on, the first adjustment units 31 at the outermost ends have low light transmittance, thus other users may not see the contents displayed on the display screen.

Also, in order to improve the display effect and the privacy protection effect, in one embodiment, the first adjustment units 31 and the second adjustment units 32 are disposed adjacent to each other. When the first adjustment units 31 and the second adjustment units 32 are disposed adjacent to each other without a gap, better privacy protection effect and better display effect could be achieved.

Moreover, optionally, the first direction is a direction perpendicular to a line connecting the first electrode layer 10 and the second electrode layer 20.

Figure 6:
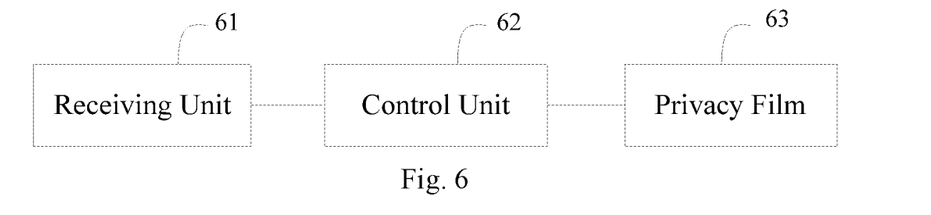
FIG. 6 is a schematic structural diagram of a privacy display system according to an embodiment of the present disclosure.

An embodiment of the present disclosure provides a privacy display system. Referring to FIG. 6, the privacy display system includes a receiving unit 61, a control unit 62 and a privacy film 63 according to the above embodiment.

The control unit 62 is coupled to the first electrode layer 10 and the second electrode layer 20.

The receiving unit 61 is configured to receive an instruction of initiating the privacy mode sent from the user, and send the instruction of initiating the privacy mode to the control unit 62.

The control unit 62 is configured to control the first electrode layer 10 and the second electrode layer 20 to be powered on according to the instruction of initiating the privacy mode, such that the first adjustment unit 31 has a light transmittance lower than the first threshold and the second adjustment unit 32 has a light transmittance higher than the second threshold.

Further, the receiving unit 61 is further configured to receive the instruction of cancelling the privacy mode sent from the user, and send the instruction of cancelling the privacy mode to the control unit 62.

The control unit 62 is further configured to control the first electrode layer 10 and the second electrode layer 20 to be powered off according to the instruction of cancelling the privacy mode, such that the first adjustment unit 31 has a light transmittance higher than the second threshold and the second adjustment unit 32 has a light transmittance lower than the first threshold.

Alternatively, the receiving unit 61 is further configured to receive the instruction of cancelling the privacy mode sent from the user, and send the instruction of cancelling the privacy mode to the control unit 62.

The control unit 62 is further configured to control the first electrode layer 10 and the second electrode layer 20 to be powered off according to the instruction of cancelling the privacy mode, such that the first adjustment unit 31 has a light transmittance higher than the second threshold and the second adjustment unit 32 has a light transmittance higher than the second threshold.

The operating principle of the privacy display system according to the embodiment of the present disclosure is similar to that in the above embodiment, and will not be elaborated herein. It can be seen that, the privacy display system according to the embodiment of the present disclosure may adjust the size of the viewing angle by electronically controlling the privacy film, to achieve a privacy protection function. The privacy display system according to the embodiment of the present disclosure does not require to be frequently mounted and removed, and may achieve a privacy protection function merely by electronically controlled adjustment, and thus is easy for to be used.

Figure 7:
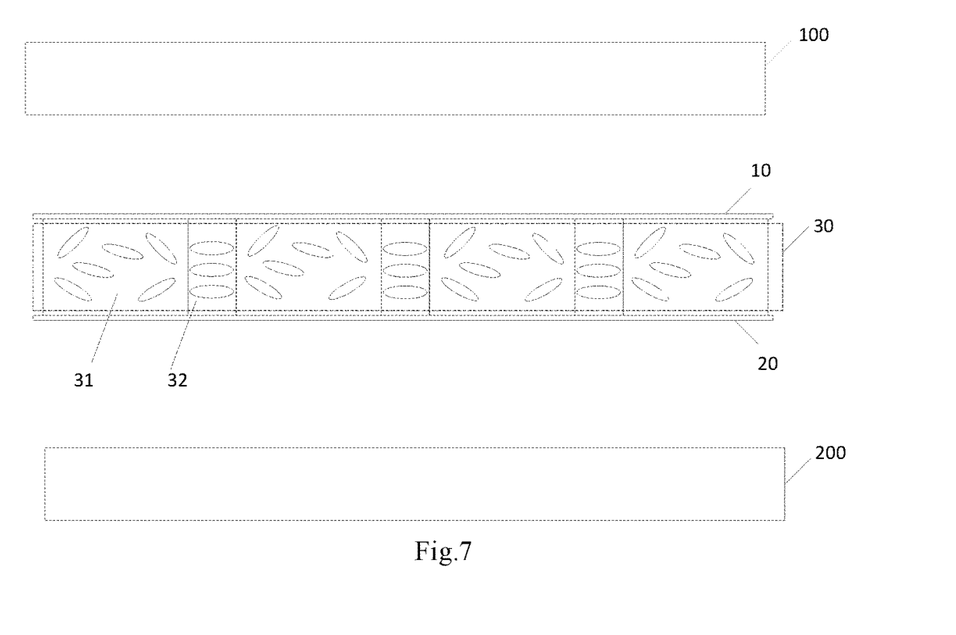
FIG. 7 is a schematic structural diagram of a display substrate according to an embodiment of the present disclosure.

An embodiment of the present disclosure also provides a display substrate. Referring to FIG. 7, the display substrate includes: a back light source 200, a display panel 100 and the privacy film described in any of the above embodiments between the back light source 200 and the display panel 100. Preferably, the back light source may be a back light source emitting a collimating light.

The display substrate according to the embodiment of the present disclosure has a technical effect similar to that in the above embodiments since the display substrate contains the privacy film in the above embodiments, which will not be elaborated herein.

An embodiment of the present disclosure also provides a display device including the display substrate described in the above embodiment.

The display device according to the embodiment of the present disclosure has a technical effect similar to that in the above embodiments since the display device contains the display substrate in the above embodiments, which will not be elaborated herein.

In the embodiment, the display device described may be applied to a mobile phone, a tablet computer, a video camera, a camera, a television or a printer and other product having a display function.

In the description of the present disclosure, it is to be noted that the azimuth or positional relationship indicated by the terms "upper", "lower" and the like is based on the azimuth or positional relationship shown in the drawings only for ease of description of the present disclosure and simplified description, rather than indicating or implying that the device or element referred to must have a specific orientation, constructed and operated in a particular orientation and therefore cannot be construed as limiting the present disclosure. The terms "mount", "connecting", "connected" should be understood in a broad sense, for example, either as a fixed connection or as a detachable connection or as an integral connection. It may be a mechanical connection, and may also be electrically connected. It may be directly connected, and may also be indirectly connected through intermediate medium, or may between two components of the internal connectivity. The specific meaning of the above-mentioned terms in the present disclosure can be understood by those skilled in the art in light of specific circumstances.

It should also be noted that, relational terms herein such as first and second are used only to distinguish one entity or operation from another entity or operation without necessarily requiring or implying that there is any such physical relationship or sequence between these entities or operations. Moreover, the term "comprise" or "include" or any other variant thereof is intended to encompass a non-exclusive sense, such that the process, method, article, or device that including a series of elements includes not only those elements but also other elements that are not explicitly listed, or include elements that are inherent to such process, method, article, or device. In the absence of more restrictions, the elements defined by the statement "including a . . . " do not preclude the presence of additional identical elements in the process, method, article, or device.

The foregoing embodiments are merely illustrative of the technical solutions of the present disclosure and are not intended to be limiting thereof. Although the present disclosure has been described in detail with reference to the foregoing embodiments, it will be understood by those of ordinary skill in the art that the present disclosure may be directed to the foregoing embodiments or the equivalents of some of the technical features therein. Such modifications or substitutions do not depart the corresponding technical solutions from the spirit and scope of the technical solutions of the various embodiments of the present disclosure.

What is claimed is:

1. A privacy film comprising a first electrode layer, a second electrode layer and an adjustment film layer interposed between the first electrode layer and the second electrode layer,
    wherein the adjustment film layer comprises a plurality of first adjustment units and a plurality of second adjustment units alternatively arranged along a first direction, each of the first adjustment units has a width larger than a width of each of the second adjustment units in the first direction; and
    when the first electrode layer and the second electrode layer are powered on, each of the first adjustment units has a light transmittance lower than a first threshold, and each of the second adjustment units has a light transmittance higher than a second threshold, wherein the second threshold is larger or equal to the first threshold,
    wherein the first electrode layer and the second electrode layer are integral respectively to correspond to the plurality of first adjustment units and the plurality of second adjustment units of the adjustment film layer, so that when the first electrode layer and the second electrode layer are powered on, a same voltage is applied to the plurality of first adjustment units and the plurality of second adjustment units.

2. The privacy film of claim 1, wherein the outmost ends at both sides of the adjustment film layer are provided as the first adjustment units.

3. The privacy film of claim 1, wherein each of the first adjustment units and each of the second adjustment units are disposed adjacent to each other.

4. The privacy film of claim 1, wherein the first direction is a direction perpendicular to a line connecting the first electrode layer and the second electrode layer.

5. The privacy film of claim 1, wherein the width of each of the first adjustment unit in the first direction is 2 to 6 times of the width of each of the second adjustment unit in the first direction.

6. The privacy film of claim 1, wherein the first threshold is 25%, and the second threshold is 60%.

7. The privacy film of claim 1, wherein the first adjustment unit is implemented as a first type of electronically controlled optical film, and the second adjustment unit is implemented as a second type of electronically controlled optical film which is different from the first type of electronically controlled optical film.

8. The privacy film of claim 1, wherein when the first electrode layer and the second electrode layer are powered off, each of the first adjustment units has a light transmittance higher than the second threshold, and each of the second adjustment units has a light transmittance lower than the first threshold.

9. The privacy film of claim 8, wherein
    each of the first adjustment units comprises a first liquid crystal cavity containing polymer dispersed liquid crystals therein, and
    each of the second adjustment units comprises a second liquid crystal cavity containing organic electrolyte liquid crystals therein.

10. The privacy film of claim 1, wherein
    each of the first adjustment units comprises a first liquid crystal cavity containing polymer dispersed liquid crystals therein, and
    each of the second adjustment units comprises a second liquid crystal cavity containing organic electrolyte liquid crystals therein.

11. The privacy film of claim 10, wherein when the first electrode layer and the second electrode layer are powered off, light is scattered when passing through the first liquid crystal cavity containing the polymer dispersed liquid crystals, and directly transmits through the second liquid crystal cavity containing the organic electrolyte liquid crystals.

12. A privacy display system comprising a receiving unit, a control unit and a privacy film of claim 1, wherein
    the control unit is coupled to the first electrode layer and the second electrode layer;
    the receiving unit is configured to receive an instruction of initiating a privacy mode sent from a user, and send the instruction of initiating the privacy mode to the control unit; and
    the control unit is configured to control the first electrode layer and the second electrode layer to be powered on according to the instruction of initiating the privacy mode, such that the first adjustment unit has a light transmittance lower than the first threshold and the second adjustment unit has a light transmittance higher than the second threshold.

13. The privacy display system of claim 12, wherein
    the receiving unit is configured to receive an instruction of cancelling the privacy mode sent from the user, and send the instruction of initiating the privacy mode to the control unit; and
    the control unit is further configured to control the first electrode layer and the second electrode layer to be powered off according to the instruction of cancelling the privacy mode, such that the first adjustment unit has a light transmittance higher than the second threshold and the second adjustment unit has a light transmittance lower than the first threshold.

14. The privacy display system of claim 12, wherein
the receiving unit is further configured to receive the instruction of cancelling the privacy mode sent from the user, and send the instruction of cancelling the privacy mode to the control unit; and
the control unit is further configured to control the first electrode layer and the second electrode layer to be powered off according to the instruction of cancelling the privacy mode, such that the first adjustment unit has a light transmittance higher than the second threshold and the second adjustment unit has a light transmittance higher than the second threshold.

15. A display substrate comprising a back light source, a display panel and the privacy film of claim 1 between the back light source and the display panel.

16. The display substrate of claim 15, wherein the back light source is a back light source emitting a collimating light.

17. A display device comprising the display substrate of claim 15.

18. The privacy film of claim 1, wherein when the first electrode layer and the second electrode layer are powered off, each of the first adjustment units and each of the second adjustment unit have a light transmittance higher than the second threshold.

19. The privacy film of claim 18, wherein
each of the first adjustment units comprises a first liquid crystal cavity containing polymer dispersed liquid crystals therein, and
each of the second adjustment units comprises a transparent thin film, the transparent thin film has a light transmittance higher than the second threshold regardless whether the first electrode layer and the second electrode layer are powered on or off.

20. The privacy film of claim 19, wherein when the first electrode layer and the second electrode layer are powered off, light is scattered when passing through the first liquid crystal cavity containing the polymer dispersed liquid crystals, and is not affected by the second adjustment unit as the transparent thin film when passing through the second adjustment units.

* * * * *